(12) United States Patent
Ishii (10) Patent No.: US 10,024,535 B2
(45) Date of Patent: Jul. 17, 2018

(54) PULVERIZED FUEL SUPPLY METHOD FOR OXYFUEL COMBUSTION BOILER, AND OXYFUEL COMBUSTION BOILER SYSTEM

(71) Applicant: IHI Corporation, Koto-ku (JP)

(72) Inventor: Toru Ishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 1108 days.

(21) Appl. No.: 14/271,095

(22) Filed: May 6, 2014

(65) Prior Publication Data

US 2014/0238281 A1 Aug. 28, 2014

Related U.S. Application Data

(63) Continuation of application No. PCT/JP2012/007159, filed on Nov. 8, 2012.

(30) Foreign Application Priority Data

Nov. 16, 2011 (JP) .................. 2011-250503

(51) Int. Cl.
*F23N 1/04* (2006.01)
*F23C 9/00* (2006.01)
(Continued)

(52) U.S. Cl.
CPC .............. *F23N 1/042* (2013.01); *F23C 9/003* (2013.01); *F23C 9/08* (2013.01); *F23K 1/00* (2013.01);
(Continued)

(58) Field of Classification Search
CPC ........ F23C 9/003; F23C 9/08; F23C 2202/20; F23C 2202/10; F23L 15/00; F23L 7/007;
(Continued)

(56) References Cited

U.S. PATENT DOCUMENTS 3,969,068 A * 7/1976 Miller ............... C03B 5/235
110/106
4,226,371 A 10/1980 Willams
(Continued)

FOREIGN PATENT DOCUMENTS

JP 55-134217 A 10/1980
JP 59-024115 A 2/1984
(Continued)

OTHER PUBLICATIONS

Extended Search Report dated Aug. 13, 2015 in European Patent Application No. 12850226.7
International Search Report dated Feb. 5, 2013 for PCT/JP2012/007159 filed Nov. 8, 2012 in English.

*Primary Examiner* — David J Laux
(74) *Attorney, Agent, or Firm* — Oblon, McClelland, Maier & Neustadt, L.L.P.

(57) ABSTRACT

In an oxyfuel combustion boiler system, nitrogen gas separated by an air separation unit (ASU) is supplied as carrier gas to a pulverizer for drying and pulverization of fuel. A fluid mixture of the nitrogen gas from the pulverizer with pulverized fuel is supplied to a powder separation device where the pulverized fuel is separated. The separated pulverized fuel is mixed with the primary recirculated flue gas and supplied to a burner.

4 Claims, 5 Drawing Sheets

(51) Int. Cl.
*F23K 1/00* (2006.01)
*F23L 15/00* (2006.01)
*F23L 7/00* (2006.01)
*F23C 9/08* (2006.01)
*F23K 3/02* (2006.01)

(52) U.S. Cl.
CPC ............... *F23K 3/02* (2013.01); *F23L 7/007* (2013.01); *F23L 15/00* (2013.01); *F23C 2202/20* (2013.01); *F23K 2201/1003* (2013.01); *F23K 2201/20* (2013.01); *F23K 2201/30* (2013.01); *F23K 2201/50* (2013.01); *Y02E 20/322* (2013.01); *Y02E 20/344* (2013.01); *Y02E 20/348* (2013.01)

(58) Field of Classification Search
CPC .......... F23K 1/00; F23K 3/02; F23K 2201/50; F23K 2201/1003; F23K 2201/20; F23K 2201/30; F23K 2203/006; F23K 2203/008; F23K 2203/201; Y02E 20/322; Y02E 20/344; Y02E 20/348
See application file for complete search history.

(56) References Cited

U.S. PATENT DOCUMENTS

| | | | |
|---|---|---|---|
| 4,346,302 A | | 8/1982 | Bozzuto |
| 4,519,587 A | * | 5/1985 | Peckels ................. C21C 5/4606 266/216 |
| 8,550,017 B2 | | 10/2013 | Terushita et al. |
| 2010/0077941 A1 | | 4/2010 | D'Agostini |
| 2011/0073020 A1 | | 3/2011 | Taniguchi et al. |

FOREIGN PATENT DOCUMENTS

| | | |
|---|---|---|
| JP | 63-267814 A | 11/1988 |
| JP | 05-026409 A | 2/1993 |
| JP | 5-31396 A | 2/1993 |
| JP | 05-312305 A | 11/1993 |
| JP | 2007-147162 A | 6/2007 |
| JP | 2011-75175 A | 4/2011 |
| WO | WO 2009/110033 A1 | 9/2009 |

* cited by examiner

PULVERIZED FUEL SUPPLY METHOD FOR OXYFUEL COMBUSTION BOILER, AND OXYFUEL COMBUSTION BOILER SYSTEM

TECHNICAL FIELD

The present invention relates to a pulverized fuel supply method for an oxyfuel combustion boiler, and an oxyfuel combustion boiler system.

BACKGROUND ART

Combustion with air as oxidizer has been generally applied in conventional boiler systems for thermal power generation. In such air combustion boilers, coal is in heavy use as fuel because of richness in recoverable reserves. However, in the coal-using boiler systems, an amount of carbon dioxide generated per unit heat value is greater than that in boiler systems using other fossil fuel such as natural gas or petroleum. Thus, research and development on techniques for carbon dioxide capture and storage (CCS) has been actively advanced from a viewpoint of global warming countermeasures.

Thus, there have been proposed oxyfuel combustion boilers capable of enhancing a concentration of carbon dioxide by oxyfuel combustion to effectively capture the carbon dioxide (see, for example, Patent Literatures 1 and 2).

Patent Literatures 1 and 2 disclose techniques for enhancing a concentration of carbon dioxide by an oxyfuel combustion boiler using coal as fuel, air being separated by an air separation unit (ASU) into oxygen and nitrogen-prevailing gas (hereinafter, referred to as nitrogen gas), the resultant oxygen being supplied to a boiler furnace. In Patent Literature 2, recirculated flue gas extracted from the flue gas downstream of the boiler furnace is partly supplied as primary recirculated flue gas to a pulverizer to dry and pulverize coal, a fluid mixture of a resultant pulverized fuel with the primary recirculated flue gas being supplied to a burner of the boiler furnace. A remainder of the recirculated flue gas is supplied as secondary recirculated flue gas to the boiler furnace (e.g., a wind box thereof), the secondary recirculated flue gas being adjusted to adjust a concentration of oxygen supplied from the ASU to thereby stabilize the oxyfuel combustion of the pulverized fuel. As a result, the gas supplied to the boiler furnace for combustion of the pulverized fuel is mainly constituted by oxygen, carbon dioxide and water vapor, and combustion flue gas has a suppressed amount of nitrogen and is substantially constituted by carbon dioxide, so that a concentration of carbon dioxide in the flue gas can be substantially enhanced in comparison with that in conventional boiler systems where the flue gas has a great amount of nitrogen by the air combustion.

CITATION LIST

Patent Literature

[Patent Literature 1] JP 05-026409A
[Patent Literature 2] JP 2007-147162A

SUMMARY OF INVENTION

Technical Problems

When the primary recirculated flue gas, which retains moisture, is supplied as carrier gas to the pulverizer for drying and pulverization of the coal as mentioned in the above, it is feared that the pulverized fuel may get moist to hinder transportation of the pulverized fuel. Specifically, it is considered, for example, that solidification of the pulverized fuel due to the moisture may dramatically deteriorate fluidity of the pulverized fuel. It is further feared that acidic gas such as sulfur dioxide ($SO_2$), sulfur trioxide ($SO_3$) or other sulfur oxides ($SO_X$) accompanying the primary recirculated flue gas may react with the moisture into sulfuric acid which erodes instruments such as the pulverizer and pipings. It is still further feared that moistness of the pulverized fuel may deteriorate combustibleness of the pulverized fuel.

After all, the primary recirculated flue gas must be dry. To this end, it has been generally conducted to dehydrate the primary recirculated flue gas by cooling once the primary recirculated flue gas for removal of the moisture and then heating the primary recirculated flue gas again. However, in a cooling zone for such cooling, sulfur oxides ($SO_X$) coexisting in the primary recirculated flue gas may react with the condensed moisture into acidic drainage (sulfuric acid) to erode pipings and other instruments, so that the pipings and other instruments require to be made from corrosive-resistant material, disadvantageously resulting in increased cost for the instruments.

Recently, lignite regarded as low-grade coal has been in heavy use due to fuel circumstances and the like. However, lignite has a characteristic, among others, that it tends to spontaneously burn upon drying. Therefore, supply of preheated primary recirculated flue gas for drying and pulverization to the pulverizer supplied with lignite tends to cause ignition due to oxygen included in the primary recirculated flue gas. There have been also proposed, for example, a method of supplying lumber butts or discarded lumber, together with coal, to a pulverizer for pulverization to thereby obtain pulverized fuel and a method of providing a pulverizer exclusively for pulverization of lumber and the like to obtain pulverized fuel. Such lumber and the like may also ignite upon pulverization.

Thus, in pulverization of lignite, lumber or other fuel easy to ignite as mentioned in the above, for prevention of the ignition, the primary recirculated flue gas cannot be enhanced in temperature. As a result, the primary recirculated flue gas requires to be cooled just like the case mentioned in the above, disadvantageously resulting in increased cost for the instruments.

Disclosed in Patent Literature 2 is the boiler in which coal is supplied to the coal pulverizer supplied with carrier air heated by a superheater, resultant pulverized coal being entrained on the carrier air to a solid-gas separator, the pulverized coal having gotten free from the carrier air in the solid-gas separator being supplied to a hopper. The pulverized coal in the hopper is mixed with oxygen from the ASU, using a pulverized coal gauge, and is introduced into a combustor.

However, in the boiler of Patent Literature 2, the heated carrier air is supplied to the coal pulverizer for pulverization of coal, so that it is feared that use of lignite or the like as fuel may bring about ignition. Stop of the heating by the air superheater for prevention of the ignition leads to failed drying of moist fuel, disadvantageously resulting in difficulty of delivery and volumetric supply of the pulverized coal.

The invention was made in view of the above and has its object to propose a pulverized fuel supply method for an oxyfuel combustion boiler and an oxyfuel combustion boiler system in which even fuel easy to ignite upon pulverization can be stably pulverized, and dried pulverized fuel can be supplied to a boiler.

Solution to Problems

The invention is directed to a pulverized fuel supply method for an oxyfuel combustion boiler comprising a pulverizer for drying and pulverizing fuel using carrier gas to discharge a fluid mixture of the carrier gas with the pulverized fuel, an air separation unit (ASU) for separating introduced air into oxygen and nitrogen gas, a boiler furnace for combustion with the fuel pulverized in said pulverizer being supplied to a burner and with the oxygen from said ASU being supplied, and recirculated flue gas flow passages for extracting part of flue gas downstream of said boiler furnace to supply part of the extracted flue gas as primary recirculated flue gas to said burner and supply the remainder as secondary recirculated flue gas to said boiler furnace, characterized by supplying the nitrogen gas separated in said ASU, as the carrier gas, to the pulverizer to dry and pulverize the fuel, supplying the fluid mixture of the nitrogen gas from said pulverizer with the pulverized fuel to a powder separation device to separate the pulverized fuel, and introducing a mixture of the separated, pulverized fuel with said primary recirculated flue gas into the burner.

The invention is directed to an oxyfuel combustion boiler system comprising a pulverizer for drying and pulverizing fuel using carrier gas to discharge a fluid mixture of the carrier gas with the pulverized fuel, an air separation unit (ASU) for separating introduced air into oxygen and nitrogen gas, a boiler furnace for combustion with the fuel pulverized in said pulverizer being supplied to a burner and with the oxygen from said ASU being supplied, and recirculated flue gas flow passages for extracting part of flue gas downstream of said boiler furnace to supply part of the extracted flue gas as primary recirculated flue gas to said burner and supply the remainder as secondary recirculated flue gas to said boiler furnace, characterized in that it comprises the pulverizer introduced, as the carrier gas, with the nitrogen gas separated in said ASU for drying and pulverizing the fuel to discharge the fluid mixture of the nitrogen gas with the pulverized fuel and a pulverized fuel supply unit comprising a powder separation device for separating the pulverized fuel from the fluid mixture discharged from said pulverizer and a powder fluidization assist system for mixing the pulverized fuel separated in said powder separation device with said primary recirculated flue gas.

In said oxyfuel combustion boiler system, said powder separation device may comprise at least either of a cyclone and a bag filter.

In said oxyfuel combustion boiler system, preferably, said pulverized fuel supply unit has sealer for preventing the nitrogen gas in the fluid mixture from being mixed with the primary recirculated flue gas.

Preferably, said oxyfuel combustion boiler system has a carrier gas preheater for heating the nitrogen gas separated in said ASU and to be introduced into said pulverizer.

Advantageous Effects of Invention

The invention, which introduces the nitrogen gas separated in the ASU, as carrier gas, into the pulverizer for drying and pulverization of the fuel, can exhibit excellent effects that an inside of the pulverizer can be kept in inert atmosphere by the nitrogen gas and thus stable pulverization can be effected even in a case of fuel easy to ignite, and that the dry pulverized fuel can be obtained since the above-mentioned nitrogen gas is not moist.

DESCRIPTION OF EMBODIMENTS

Embodiments of the invention will be described in conjunction with the drawings.

Figure 1:
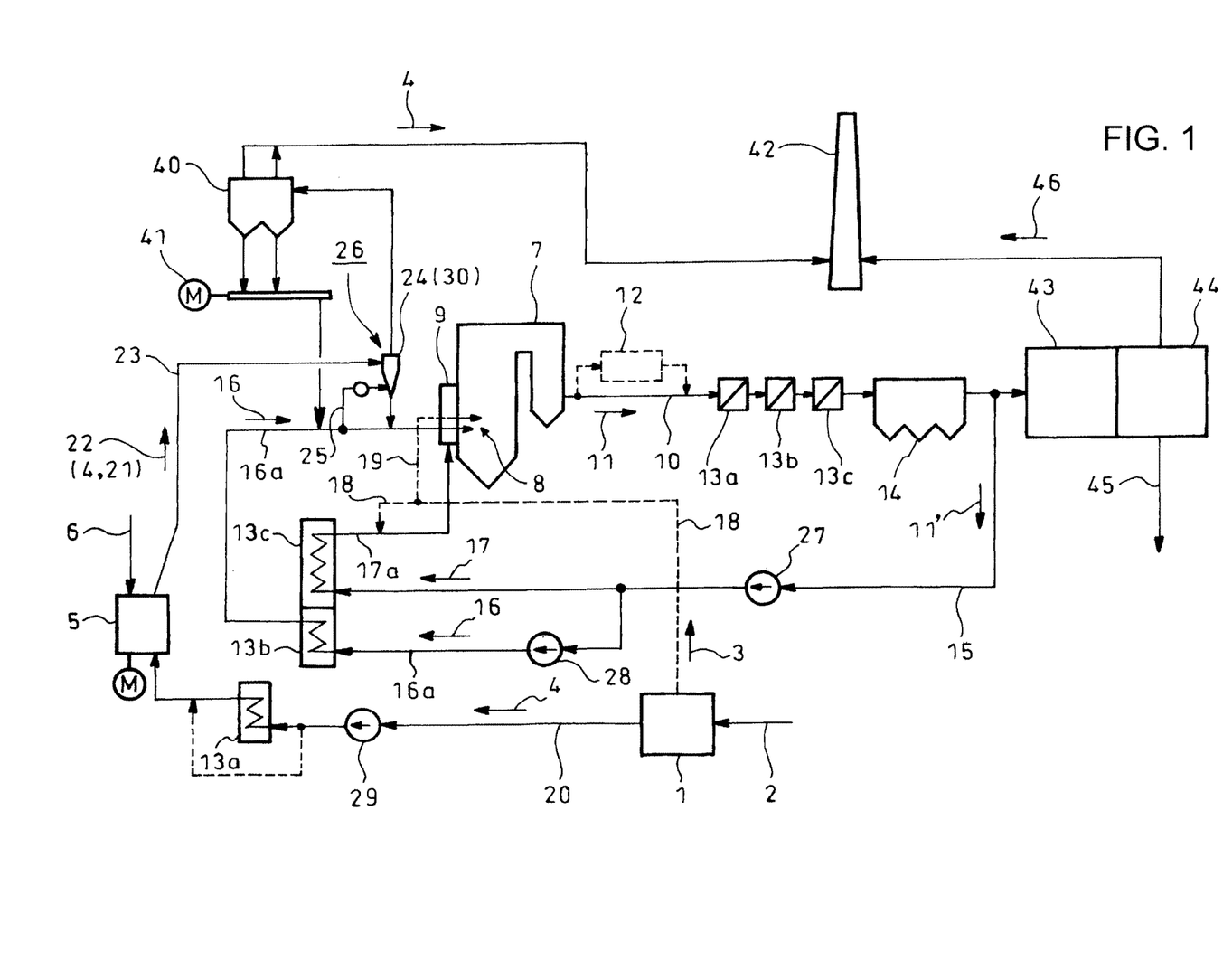
FIG. 1 is a schematic overall block diagram showing an embodiment of an oxyfuel combustion boiler system according to the invention.

FIG. 1 schematically shows an embodiment of an oxyfuel combustion boiler system according to the invention. In FIG. 1, reference numeral 1 denotes an ASU which separates introduced air 2 into oxygen 3 and nitrogen gas 4 (nitrogen-prevailing gas); 5, a pulverizer which pulverizes introduced coal or other solid fuel 6; 7, a boiler furnace with a burner 8 and a wind box 9; and 10, a gas flue which guides flue gas 11 from the boiler furnace 7 downstream. The gas flue 10 is provided with a denitration device 12, a carrier gas preheater 13*a*, a primary air heater 13*b*, a secondary air heater 13*c* and a dust eliminator 14.

Branched from the gas flue 10 at an exit side of the dust eliminator 14 is a recirculation flow passage 15 which extracts part of flue gas 11 as recirculated flue gas 11'. Part of the recirculated flue gas 11' is supplied as primary recirculated flue gas 16 by a primary recirculated flue gas flow passage 16*a* via the above-mentioned primary air heater 13*b* to the burner 8. The remainder of the recirculated flue gas 11' is supplied as secondary recirculated flue gas 17 by a secondary recirculated flue gas flow passage 17*a* via the above-mentioned secondary air heater 13*c* to the boiler furnace 7. The boiler furnace 7 supplied with the secondary recirculated flue gas 17 is, for example, the wind box 9 or an over air port (OAP; not shown) on an upper portion of the wind box 9.

The oxygen 3 separated in the ASU 1 is mixed with the secondary recirculated flue gas 17 in the secondary recirculated flue gas flow passage 17*a*, using the oxygen supply pipe 18. Part of the oxygen 3 may be supplied to the burner 8 in a branched manner, using a branch pipe 19.

The nitrogen gas 4 separated in the ASU 1 is supplied as carrier gas by a nitrogen gas supply pipe 20 via the above-mentioned carrier gas preheater 13*a* to the pulverizer 5. As a result, in the pulverizer 5, the solid fuel 6 is dried and pulverized by the supply of the nitrogen gas 4, and a fluid mixture 22 of a resultant pulverized fuel 21 with the nitrogen gas 4 is discharged through a fluid mixture pipe 23. In FIG. 1, reference numerals 27, 28 and 29 denote forced draft fans.

The fluid mixture 22 is introduced through the fluid mixture pipe 23 into a pulverized fuel supply unit 26 comprising a powder separation device 24 which separates the pulverized fuel 21 from the introduced fluid mixture 22, and a powder fluidization assist system 25 which mixes the pulverized fuel 21 separated by the powder separation device 24 with the primary recirculated flue gas 16 in the primary recirculated flue gas flow passage 16a connected to the burner 8.

Figure 2:
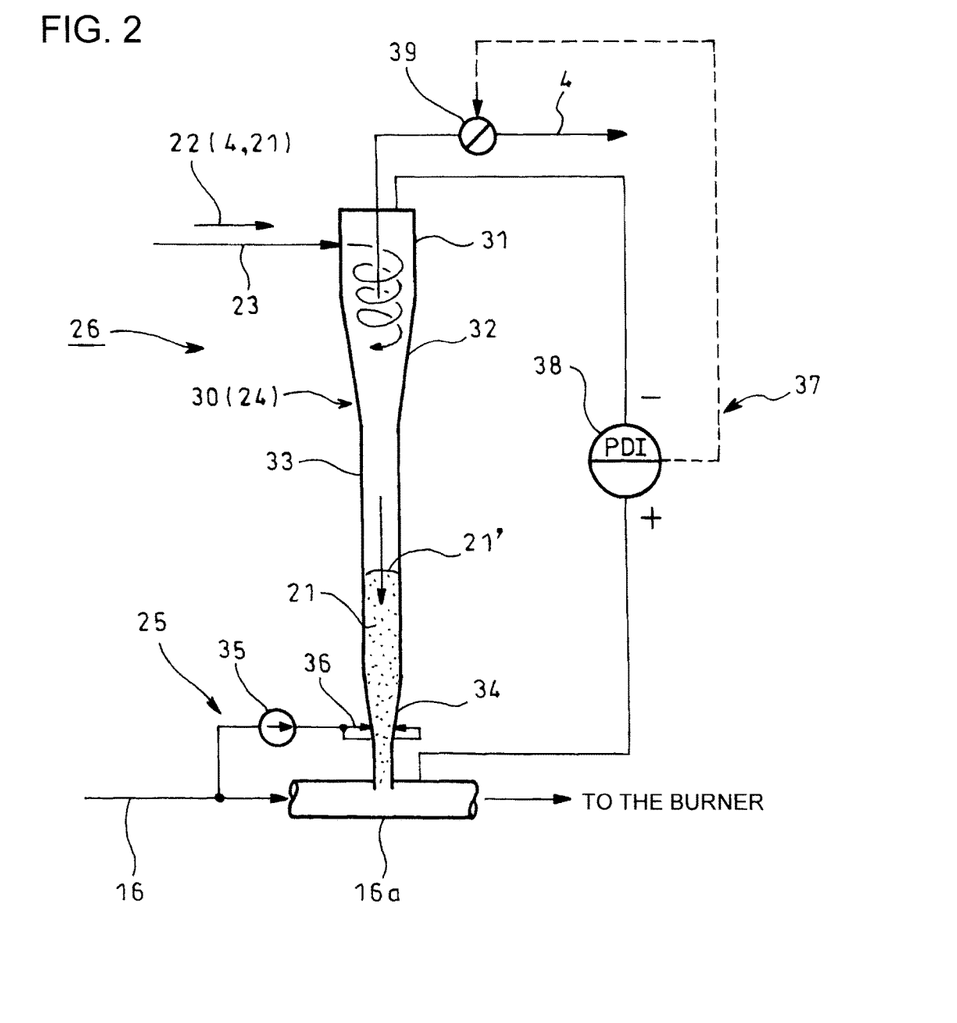
FIG. 2 is a side view detailedly showing an example of the pulverized fuel supply unit shown in FIG. 1.

FIG. 2 detailedly shows an example of the pulverized fuel supply unit 26 shown in FIG. 1 which supplies the fluid mixture 22 from the pulverizer 5 to a cyclone 30 as powder separation device 24. In a case where a plurality of cyclones 30 are arranged for a plurality of burners 8, the fluid mixture pipe 23 from the pulverizer 5 are branched plurally, each of the branched fluid mixture pipes 23 being connected to a corresponding one of the cyclones 30.

The fluid mixture 22 from the fluid mixture pipe 23 is tangentially introduced into an upper, large-diameter portion 31 of the cyclone 30. While the fluid mixture 22 introduced into the cyclone 30 swirls in a downwardly convergent portion 32, the pulverized fuel 21 is separated therefrom by a centrifugal force and the separated, pulverized fuel 21 drops into a cylindrical portion 33 under the convergent portion 32, the separated nitrogen gas 4 being extracted centrally through the upper portion of the cyclone 30. Formed under the cylindrical portion 33 is a further downwardly convergent portion 34. The pulverized fuel 21 having passed through the convergent portion 34 is supplied to the primary recirculated flue gas flow passage 16a for mixing with the primary recirculated flue gas 16 and then supplied to the burner 8.

There may occur a phenomenon (bridge phenomenon) that the pulverized fuel 21 may be clogged in the lower, convergent portion 34 of the cyclone 30. In order to prevent the clogging and stably supply the pulverized fuel 21 to the primary recirculated flue gas flow passage 16a, a powder fluidization assist system 25 is provided which serves for branching and pressurization, by a pressure fan 35, of part of the primary recirculated flue gas 16 from the primary recirculated flue gas flow passage 16a and which has a nozzle 36 for blowing of the pressurized primary recirculated flue gas 16 into the convergent portion 34. With the powder fluidization assist system 25, the pulverized fuel 21 in the convergent portion 34 is fluidized by the primary recirculated flue gas 16 blown by the nozzle 36 to prevent the clogging of the pulverized fuel 21, whereby the pulverized fuel 21 is stably supplied to the primary recirculated flue gas flow passage 16a.

The pulverized fuel supply unit 26 in FIG. 2 is provided with sealer 37 for prevention of the nitrogen gas 4 in the fluid mixture 22 introduced into the cyclone 30 from being admixed into the primary recirculated flue gas flow passage 16a. The sealer 37 has a sensor 38 which detects any difference between a pressure of the primary recirculated flue gas 16 in the primary recirculated flue gas flow passage 16a and a pressure in an upper inside of the cyclone 30. By use of the sensor 38, an opening degree of a flow rate regulator 39 (damper) arranged at an exit side of the nitrogen gas 4 of the cyclone 30 is regulated such that the upper inside in the cyclone 30 is lower in pressure than the primary recirculated flue gas 16 by a predetermined value. Such regulation of the upper inside in the cyclone 30 lower in pressure than the primary recirculated flue gas 16 by the predetermined value allows the pulverized fuel 21 to be accumulated in the cyclone 30 by a predetermined layer thickness to thereby provide a pulverized fuel layer 21' which exhibits sealing performance to prevent the nitrogen gas 4 in the cyclone 30 from leaking to the primary recirculated flue gas flow passage 16a and thus from being mixed with the primary recirculated flue gas 16.

In FIG. 1, a bag filter 40 is provided which separates the powder from the introduced nitrogen gas 4 separated by the cyclone 30. The powder separated by the bag filter 40 is supplied to the primary recirculated flue gas flow passage 16a by a screw feeder 41 having sealability. The nitrogen gas 4 having gotten free from the powder in the bag filter 40 is introduced into a stack 42. The powder separated in the bag filter 40 may be disposed.

Provided in the gas flue 10 shown in FIG. 1 downstream of the branch to the recirculation flow passage 15 is an flue gas refinery 43. Further provided downstream of the flue gas refinery 43 is a $CO_2$ compression and purification unit (CPU) 44 which produces and discharges liquefied carbon dioxide 45. Non-condensable off gas 46 separated upon discharge of the liquefied carbon dioxide 45 in the CPU 44 is introduced into the stack 42.

Next, mode of operation of the above-mentioned embodiment will be described.

The flue gas 11 at the exit side of the dust eliminator 14 in the gas flue 10 from the boiler furnace 7 is branched by the recirculation flow passage 15, and part of the branched recirculated flue gas 11' passes as primary recirculated flue gas 16 through the primary recirculated flue gas flow passage 16a, preheated by the primary air heater 13b and supplied to the burner 8. The remainder of the separated recirculated flue gas 11' passes as secondary recirculated flue gas 17 through the secondary recirculated flue gas flow passage 17a, preheated by the secondary air heater 13c and supplied to the wind box 9 of the boiler furnace 7.

The oxygen 3 separated from the air 2 in the ASU 1 is mixed with the secondary recirculated flue gas 17 in the secondary recirculated flue gas flow passage 17a by the oxygen supply pipe 18. In this case, part of the oxygen 3 may be branched by the branch pipe 19 and supplied to the burner 8.

Meanwhile, the nitrogen gas 4 separated from the air 2 in the ASU 1 passes through the nitrogen gas supply pipe 20, and is preheated by the carrier gas preheater 13a and supplied as carrier gas to the pulverizer 5. In the pulverizer 5 supplied with the coal or other fuel 6, the fuel 6 is dried and pulverized by the supply of the nitrogen gas 4, and the fluid mixture 22 of the pulverized fuel 21 with the nitrogen gas 4 is discharged through the fluid mixture pipe 23.

Here, the nitrogen gas 4 from the ASU 1 is not moist and is heated by the carrier gas preheater 13a, so that the fuel 6 is favorably dried and pulverized. Moreover, the nitrogen gas 4 from the ASU 1 contains no oxygen and the inside of the pulverizer 5 is kept in the inert atmosphere by the nitrogen gas 4, so that the pulverized fuel 21 can be surely prevented from igniting even in the case of the pulverization of the lignite or other fuel 6 easy to ignite. Moreover, as mentioned in the above, nitrogen gas 4 is heated by the carrier gas preheater 13a, so that even moist fuel 6 can be supplied to the pulverizer 5 for drying and pulverization.

The fluid mixture 22 discharged through the fluid mixture pipe 23 from the pulverizer 5 is introduced into the cyclone 30 as powder separation device 24 in the pulverized fuel supply unit 26 and is separated into the pulverized fuel 21 and the nitrogen gas 4, the pulverized fuel 21 dropping downward in the cyclone 30.

In this case, since the sealer 37 is provided which has the sensor 38 for detection of any difference between the pressure of the primary recirculated flue gas 16 in the primary recirculated flue gas flow passage 16a and the pressure in the upper inside of the cyclone 30, the opening degree of the flow rate regulator 39 (damper) at the exit side of the nitrogen gas 4 of the cyclone 30 is regulated, using the sensor 38, such that the upper inside in the cyclone 30 is lower in pressure than the primary recirculated flue gas 16 by the predetermined value, and thus the pulverized fuel layer 21' with the required layer thickness is always formed by the pulverized fuel 21 in the cyclone 30. Meanwhile, the lower convergent portion 34 of the cyclone 30 is provided with the powder fluidization assist system 25 for blowing thereinto part of the primary recirculated flue gas 16 in the primary recirculated flue gas flow passage 16a blanched and pressurized by the pressure fan 35, so that the pulverized fuel 21 in the pulverized fuel layer 21' is stably cut out and mixed with the primary recirculated flue gas 16.

Thus, the pulverized fuel 21 separated in the cyclone 30 is stably cut out into the primary recirculated flue gas flow passage 16a by the powder fluidization assist system 25 with a predetermined thickness of pulverized fuel layer 21' being always formed in the cyclone 30, so that the pulverized fuel layer 21' exhibits the sealing performance to prevent the nitrogen gas 4 in the cyclone 30 from leaking to the primary recirculated flue gas flow passage 16a. As a result, prevented is lowering of the carbon dioxide concentration in the flue gas 11 into dilution due to the nitrogen gas 4 leaking and being mixed with the primary recirculated flue gas 16. Basically, the powder fluidization assist system 25 is constantly used, but may be stopped when the powder supply is satisfactory.

Figure 3:
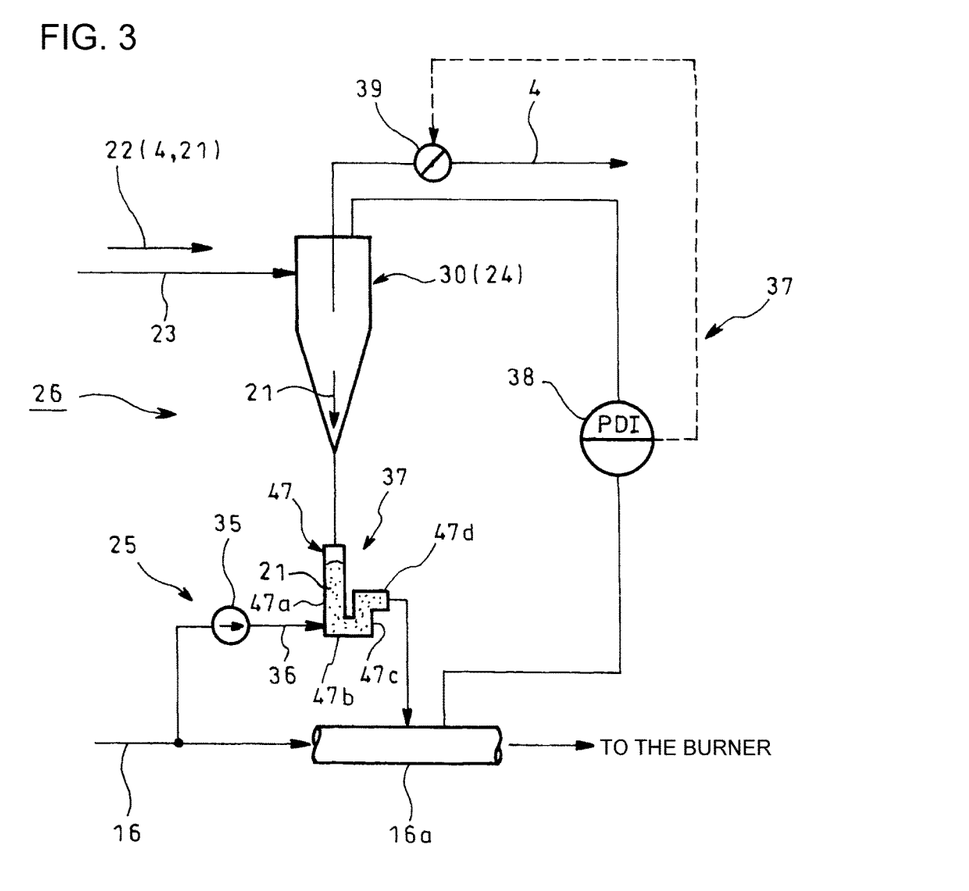
FIG. 3 is a side view detailedly showing a modification of the pulverized fuel supply unit shown in FIG. 2.

FIG. 3 detailedly shows a modification of the pulverized fuel supply unit 26 comprising a powder separation device 24 in the form of a cyclone 30 and a powder fluidization assist system 25. In this modification, provided under the cyclone 30 is a sealing device 47 such as so-called J-valve adapted to reserve the pulverized fuel 21 separated in the cyclone 30. The sealing device 47 comprises a vertical portion 47a under the cyclone 30, a horizontal portion 47b extending from a lower end of the vertical portion, a riser portion 47c extending from an end of the horizontal portion 47b, and a horizontal outlet 47d extending from an upper end of the riser portion 47c. Just like FIG. 2, provided is the powder fluidization assist system 25 which serves for branching and pressurization, by a pressure fan 35, of part of the primary recirculated flue gas 16 from the primary recirculated flue gas flow passage 16a and which has a nozzle 36 for blowing of the pressurized primary recirculated flue gas 16 into the lower end of the vertical portion 47a toward the other end of the horizontal portion 47b.

Also in the FIG. 3 modification, just like FIG. 2, provided is the sealer 37 which has the sensor 38 for detection of any difference between the pressure of the primary recirculated flue gas 16 and the pressure in the upper inside of the cyclone 30. By use of the sensor 38, the opening degree of the flow rate regulator 39 (damper) at the exit side of the nitrogen gas 4 of the cyclone 30 is regulated such that the upper inside in the cyclone 30 is lower in pressure than the primary recirculated flue gas 16 by a predetermined value.

Thus, according to the FIG. 3 structure, the pulverized fuel 21 with the required layer thickness is always reserved in the sealing device 47 which is provided with the powder fluidization assist system 25 for blowing of part of the primary recirculated flue gas 16 branched and pressurized by the pressure fan 35 into the sealing device 47 by the nozzle 36, so that the pulverized fuel 21 reserved in the sealing device 47 is stably cut out and mixed with the primary recirculated flue gas 16.

Thus, the pulverized fuel 21 separated in the cyclone 30 is cut out into the primary recirculated flue gas flow passage 16a always in the state of being reserved with the predetermined thickness in the sealing device 47, so that the pulverized fuel 21 reserved in the sealing device 47 exhibits the performance as sealer 37 to prevent nitrogen gas 4 in the cyclone 30 from leaking to the primary recirculated flue gas flow passage 16a.

Figure 4:
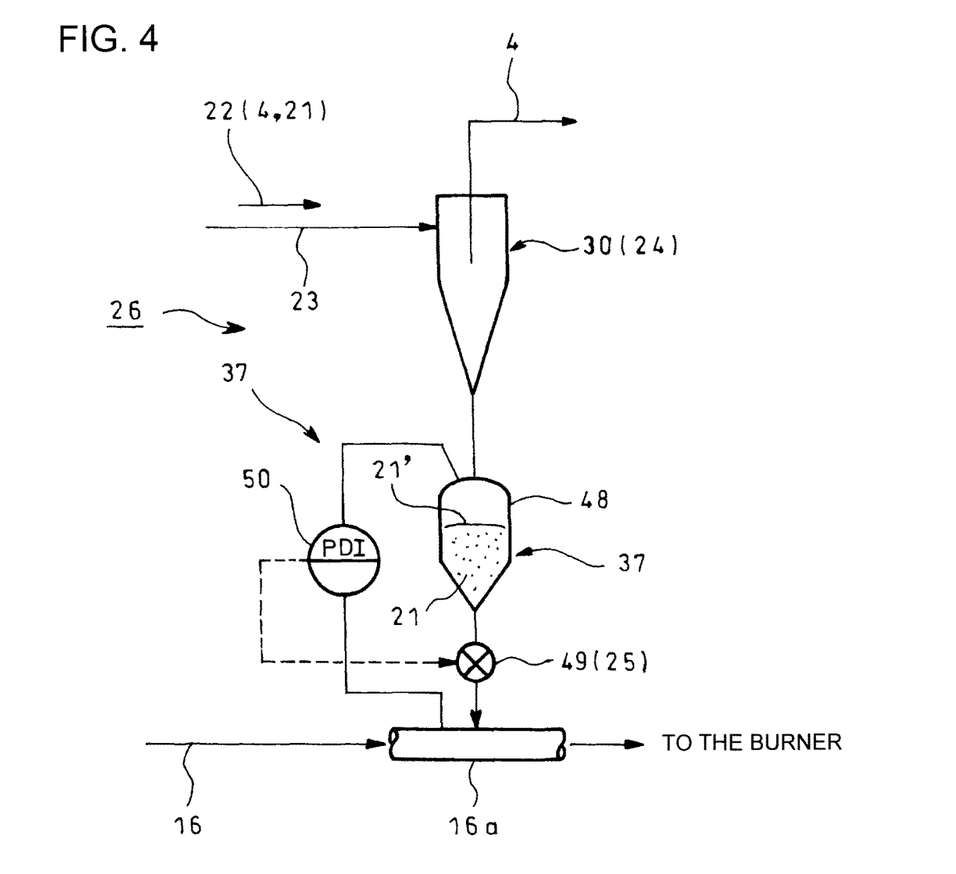
FIG. 4 is a side view detailedly showing a further modification of the pulverized fuel supply unit shown in FIG. 2.

FIG. 4 detailedly shows a still further modification of the pulverized fuel supply unit 26 with the powder separation device 24 in the form of a cyclone 30 and a powder fluidization assist system 25. In this modification, arranged under the cyclone 30 is a hopper 48 for reservation of the pulverized fuel 21 separated in the cyclone 30, and arranged under the hopper 48 is a rotary feeder 49 as powder fluidization assist system 25 for cutout of the pulverized fuel 21 to the primary recirculated flue gas flow passage 16a by a predetermined feed rate. Further provided is a sealer 37 with a sensor 50 for detection of any difference between the pressure of the primary recirculated flue gas 16 and the pressure in the upper inside of the hopper 48, a rotational speed of the rotary feeder 49 being controlled, using the sensor 50, such that the upper inside of the hopper 48 is lower in pressure than the primary recirculated flue gas 16 by a predetermined value.

According to the FIG. 4 structure, the pulverized fuel layer 21' with the required layer thickness is always formed in the hopper 48 by the action of the sealer 37, so that the pulverized fuel layer 21' reserved in the hopper 48 exhibits the sealing performance to prevent the nitrogen gas 4 in the cyclone 30 from leaking to the primary recirculated flue gas flow passage 16a.

Figure 5:
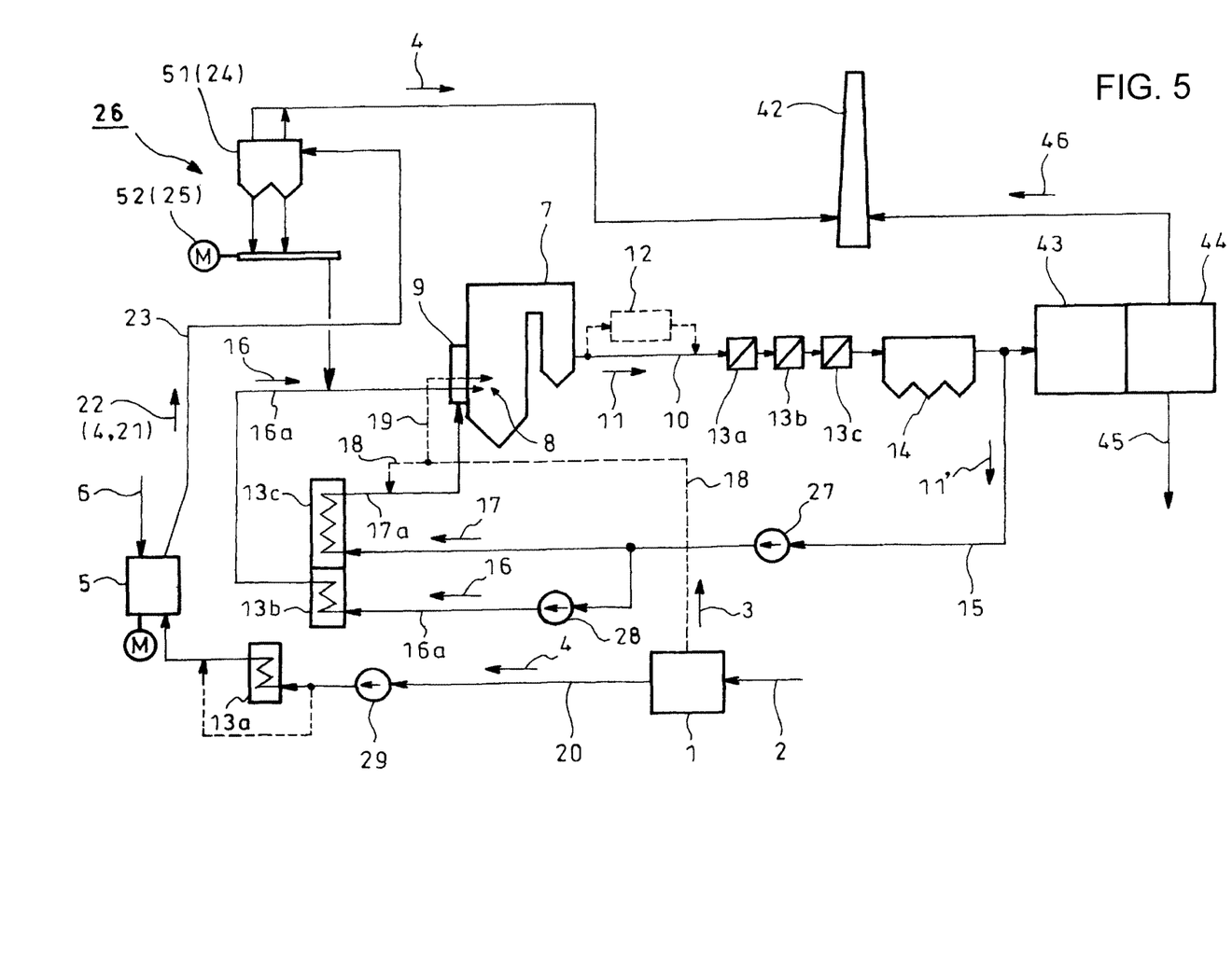
FIG. 5 is a schematic overall block diagram showing a further embodiment of the oxyfuel combustion boiler system shown in FIG. 1.

FIG. 5 schematically shows a further embodiment of the oxyfuel combustion boiler system according to the invention. The pulverized fuel supply unit 26 shown in the embodiment leads all of the fluid mixture 22 from the pulverizer 5 through the fluid mixture pipe 23 to a bag filter 51 (powder separation device 24) where the pulverized fuel 21 is separated. Then, the pulverized fuel 21 separated in the bag filter 51 is supplied by a screw feeder 52 (powder fluidization assist system 25) arranged thereunder to the primary recirculated flue gas flow passage 16a.

According to the FIG. 5 embodiment, the screw feeder 52 is kept to be filled with the pulverized fuel 21, so that the sealing performance of the pulverized fuel 21 filled in the screw feeder 52 prevents the nitrogen gas 4 from the bag filter 51 from leaking to the primary recirculated flue gas flow passage 16a. In the FIG. 5 embodiment, the pulverized fuel 21 from the exit side of the screw feeder 52 may be supplied in a plurally branched manner so as to comply with a plurality of burners 8. Thus, when a plurality of primary recirculated flue gas flow passages 16a are provided to supply the primary recirculated flue gas 16 for the plurality of burners 8, the pulverized fuel 21 branched at the exit side of the screw feeder 52 can be mixed for the primary recirculated flue gas flow passages 16a, respectively.

As mentioned in the above, according to the oxyfuel combustion boiler system of the invention, the nitrogen gas 4 separated in the ASU 1 is introduced as carrier gas into the pulverizer 5 for drying and pulverization of the fuel 6, so that the inside of the pulverizer 5 can be kept in inert atmosphere by the nitrogen gas 4 and thus stable pulverization can be made for the lignite or other fuel 6 easy to ignite, and dry pulverized fuel 4 can be obtained since the nitrogen gas 4 is not moist. The nitrogen gas 4, which is supplied as carrier gas to the pulverizer 5, is an inherently unnecessary material produced in separation of the oxygen 3 by the ASU 1; effective usage of such inherently unnecessary nitrogen gas 4 as carrier gas is economical.

Provision of either the cyclone 30 or the bag filter 51 to the powder separation device 24 makes it possible to separate and extract the pulverized fuel 21 from the fluid mixture 22 supplied from the separator 5.

The pulverized fuel supply unit 26 is provided with the sealer 37, so that nitrogen gas 4 in the fluid mixture 22 can be prevented from being mixed with the primary recirculated flue gas 16.

Since the carrier gas preheater 13a is provided for heating the nitrogen gas 4 separated in the ASU 1 and introduced to the pulverizer 5, even moist fuel 6 may be supplied to the pulverizer 5 for drying and pulverization.

It is to be understood that an oxyfuel combustion boiler system according to the invention is not limited to the above embodiments and that various changes and modifications may be made without departing from the scope of the invention.

INDUSTRIAL APPLICABILITY

An oxyfuel combustion boiler system according to the invention can be applicable to stable pulverization of fuel easy to ignite upon pulverization, and supply of the dried, pulverized fuel to a boiler.

REFERENCE SIGNS LIST 1 air separation unit (ASU)
2 air
3 oxygen
4 nitrogen gas (carrier gas)
5 pulverizer
6 fuel
7 boiler furnace
8 burner
11 flue gas
16 primary recirculated flue gas
17 secondary recirculated flue gas
21 pulverized fuel
22 fluid mixture
24 powder separation device
25 powder fluidization assist system
26 pulverized fuel supply unit
30 cyclone
37 sealer
51 bag filter

The invention claimed is:

1. An oxyfuel combustion boiler system comprising:
a pulverizer for drying and pulverizing fuel using carrier gas to discharge a fluid mixture of the carrier gas with the pulverized fuel;
an air separation unit (ASU) for separating introduced air into oxygen and nitrogen gas, a boiler furnace for combustion with the fuel pulverized in said pulverizer being supplied to a burner and with the oxygen from said ASU being supplied;
recirculated flue gas flow passages for extracting part of flue gas downstream of said boiler furnace to supply part of the extracted flue gas as primary recirculated flue gas to said burner and supply the remainder as secondary recirculated flue gas to said boiler furnace;
the pulverizer introduced, as the carrier gas, with the nitrogen gas separated in said ASU for drying and pulverizing the fuel to discharge the fluid mixture of the nitrogen gas with the pulverized fuel; and
a pulverized fuel supply unit comprising a powder separation device for separating the pulverized fuel from the fluid mixture discharged from said pulverizer and a powder fluidization assist system for branching and pressurizing part of the primary recirculated flue gas to fluidize and mix the separated pulverized fuel with the remainder of the primary recirculated flue gas,
wherein said pulverized fuel supply unit has sealer including a sensor for detecting a difference between a pressure of the primary recirculated flue gas and a pressure in the powder separation device, and a flow rate regulator arranged at an exit side of the nitrogen gas of the powder separation device and regulated in opening degree according to the difference between the pressures detected by the sensor, thereby preventing the nitrogen gas in the fluid mixture from being mixed with the primary recirculated flue gas.

2. The oxyfuel combustion boiler system as claimed in claim 1 further comprising a carrier gas preheater for heating the nitrogen gas separated in said ASU and to be introduced into said pulverizer.

3. The oxyfuel combustion boiler system as claimed in claim 1, wherein said powder separation device comprises at least either of a cyclone and a bag filter.

4. The oxyfuel combustion boiler system as claimed in claim 3 further comprising a carrier gas preheater for heating the nitrogen gas separated in said ASU and to be introduced into said pulverizer.

* * * * *